United States Patent [19]
Klingman

[11] Patent Number: 5,541,930
[45] Date of Patent: Jul. 30, 1996

[54] BYTE ALIGNED COMMUNICATION SYSTEM FOR TRANSFERRING DATA FROM ONE MEMORY TO ANOTHER MEMORY OVER AN ISDN

[76] Inventor: Edwin E. Klingman, 3000 Hwy. 84, San Gregorio, Calif. 94074

[21] Appl. No.: 370,965

[22] Filed: Jan. 10, 1995

[51] Int. Cl.$^6$ .................................................. H04J 3/12
[52] U.S. Cl. ............................................... 370/110.1
[58] Field of Search .............................. 370/110.1, 94.1, 370/79, 85.13, 105.1, 94.3, 60, 99

[56] References Cited

U.S. PATENT DOCUMENTS

| | | | |
|---|---|---|---|
| 4,755,992 | 7/1988 | Albal | 370/94.1 |
| 4,864,601 | 9/1989 | Berry | 379/96 |
| 5,012,470 | 4/1991 | Shobu et al. | 370/110.1 |
| 5,309,440 | 5/1994 | Nakamura et al. | 370/110.1 |
| 5,323,392 | 6/1994 | Ishii et al. | 370/110.1 |

*Primary Examiner*—Douglas W. Olms
*Assistant Examiner*—Ajit Patel
*Attorney, Agent, or Firm*—Claude A. S. Hamrick

[57] ABSTRACT

A system with source and destination telecommunications transceivers for communicating therebetween over an Integrated Digital Services Network, each having a general purpose computer coupled to an interface circuit for conditioning outgoing and incoming data to and from the communications network. The interface circuit is constructed with a dual port RAM, a subscriber access controller and an ISDN controller. A typical data flow proceeds with the source controller CPU sending bytes of data from a sending buffer in its memory to a first transmit buffer in the dual port RAM. This process continues until the last address in the buffer is filled, whereupon the dual port RAM outputs an interrupt signal to the ISDN controller which responds by sending the data bytes in the buffer to the subscriber access controller for transmission to the ISDN, and sends a control signal instructing the computer to load a second transmit buffer. When the first buffer is emptied the ISDN controller instructs the computer to load the second, etc until all the data is transmitted. When data is being received from the ISDN by the subscriber access controller, it send an interrupt signal to the ISDN controller to hold outgoing data and transfer the incoming data to the computer. The ISDN controller loads the incoming data into one of two receive buffers, and when it is full, sends a signal to the computer to unload the data and proceeds to load the second receive buffer, after which the computer is notified to unload the second buffer. This process is repeated until the incoming data is processed. This process retains byte alignment throughout the interface circuit. In the event that the communications network should require data to be supplied in HDLC frame format, this is provided for by programming in the computer, as is the detection of incoming HDLC framed data and the required extraction of data bytes therefrom.

13 Claims, 10 Drawing Sheets

BYTE ALIGNED COMMUNICATION SYSTEM FOR TRANSFERRING DATA FROM ONE MEMORY TO ANOTHER MEMORY OVER AN ISDN

BACKGROUND OF THE INVENTION

1. Field of the Invention

The present invention relates generally to B channel communication over the Integrated Services Digital Network, and more particularly to a transceiver system for communicating data bytes from one computer to another that accommodates byte alignment throughout the data path from a host computer through an Integrated Services Digital Network to a destination computer, and eliminates the need for conventional circuitry for ordering data in High Level Data Link Control (HDLC) frames required in existing systems for processing by routers in the communications network.

2. Description of the Prior Art

Historically, data has been transferred between computers almost from their invention. If the distance to be traversed is large in comparison to the size of the computer, the data is typically converted in format to a representation designed to make efficient use of the communications medium. For example, digital data is processed for transmission over voice lines by modems which convert ones and zeros into frequencies in the range of the sounds for which analog telephone systems have been optimized. The advent of digital telephone has changed both the engineering and economic aspects of data communications. Specifically, many hardware requirements are now met with reliable and low cost digital integrated circuits. When hardware is expensive, most systems are designed to maximize the use of each hardware element in order to minimize costs. Thus, for example, early computers were generally serial shift register based, that is, a one bit wide data stream was repeatedly shifted through one bit wide circuits. As hardware costs fell, hardware was replicated, so that four or eight bits were operated on at once, with significant increase in operational speed. As hardware costs fell further, sixteen bits were handled in parallel while today's popular computers handle thirty-two and even sixty-four bits in parallel.

Figure 1:
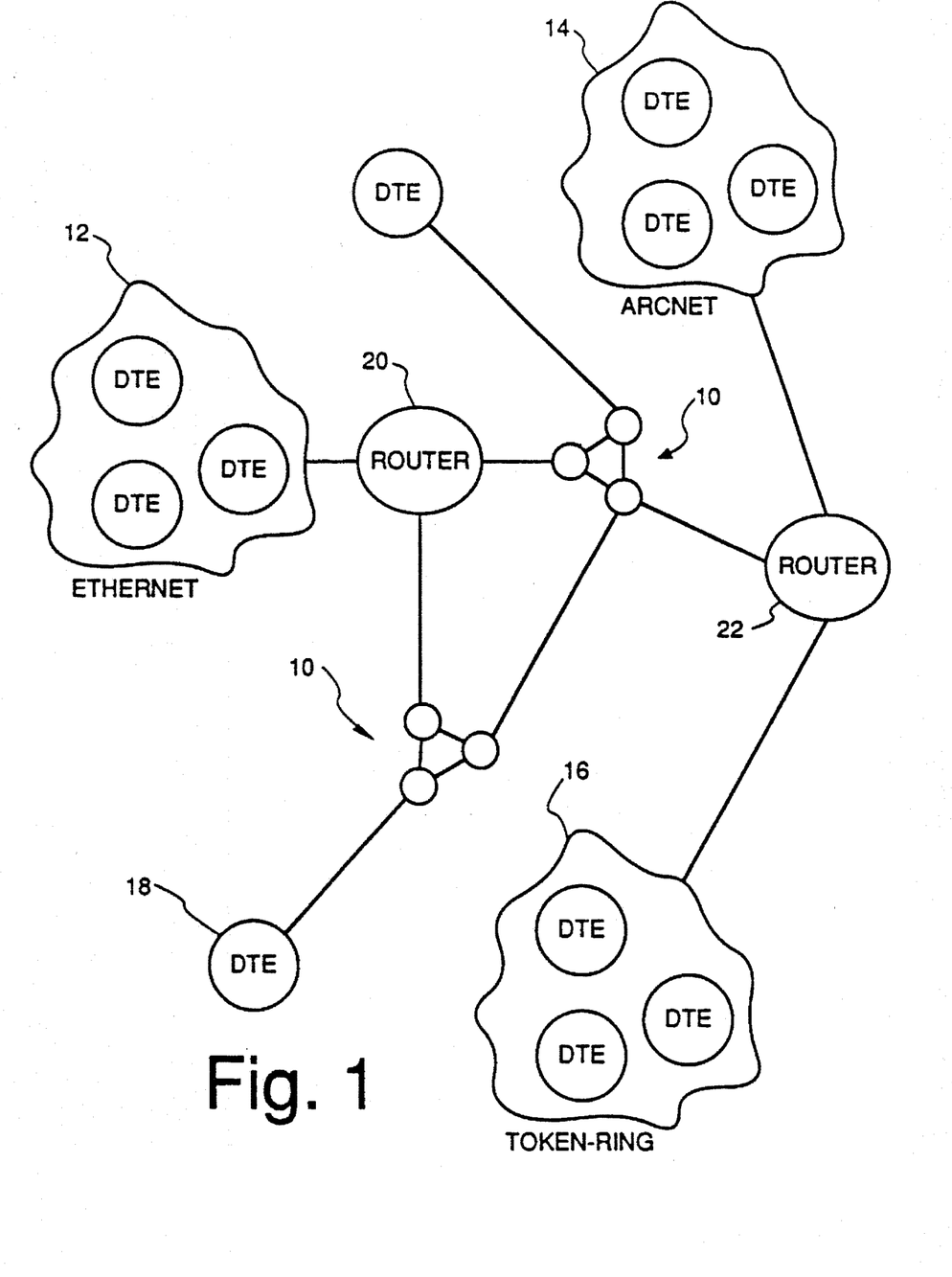
FIG. 1 illustrates interconnections of a variety of telecommunications systems.
Figures 2, 3:
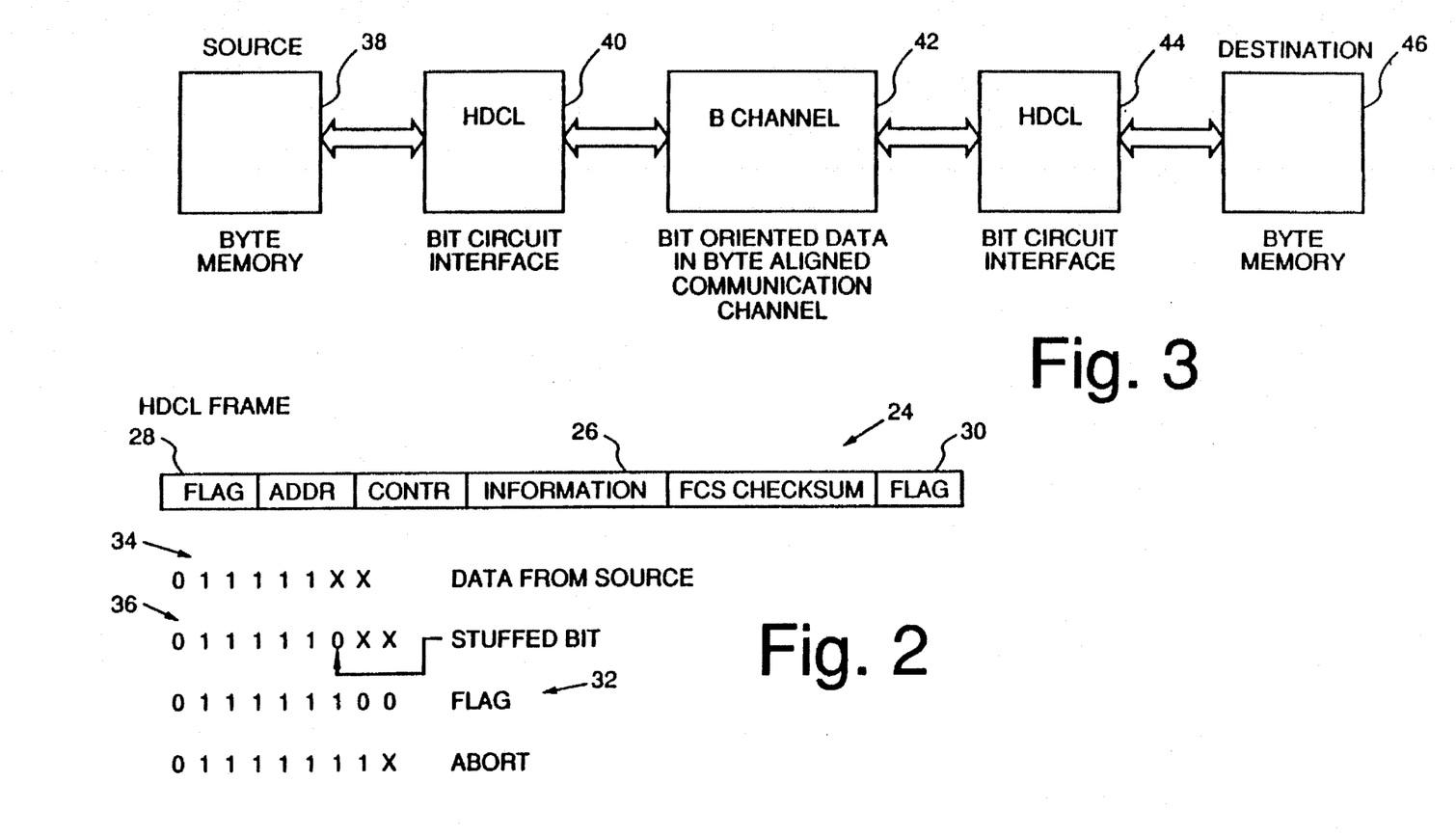
FIG. 2 shows the order of an HDLC frame and the method of bit shifting.
FIG. 3 shows the HDLC circuit position in a telecommunications system.

While computer systems have evolved from one bit through 4, 8, 16, 32 and 64 bit operations, communications systems are largely still stuck at the one bit level. The reason for this is better understood by reference to FIG. 1 which illustrates various communications network interconnections wherein data terminal equipment (DTE) can communicate through an Integrated Services Digital Network (ISDN) 10. Different systems of controlling access are used depending on whether the communication is controlled by what is known as point to point protocol or by one of the various LAN systems such as Ethernet, ARCnet or Token-Ring symbolically illustrated by 12, 14 and 16 in FIG. 1.. A DTE within a Token-Ring system 16, for example, can not be directly interconnected with a DTE in an ARCnet LAN. In order to accomplish communication between the different LAN systems as well as non LAN terminals such as DTE 18, devices called routers 20, 22 are used to direct communication and translate the various system protocols from one form to another depending on the particular source and destination types. The routers 20, 22 require incoming data to be in a special form called a High Level Data Link Control (HDLC) frame 24 as shown in FIG. 2. The data, placed in the information field 26 block is surrounded by organizational bits including Flags 28, 30 to indicate the beginning and end of each frame. The digital structure of a Flag as indicated at 32 is defined as a byte (8 bits) including a zero followed by six ones and then another zero. This creates a problem in the information field 26 because such a series of data bits would be erroneously read as a Flag. In order to avoid this error, all such sequences of bits in the data field are modified. This is done by a special HDLC circuit that stuffs a zero after every detected fifth one of a series, in effect expanding an 8 bit byte such as 34 to nine bits as shown at 36. This processing effectively destroys the byte alignment provided by a source DTE which must be restored before a destination DTE can receive it. This processing involves the expense of the HDLC circuitry and is aesthetically displeasing and organizationally complicating due to the destruction of the byte alignment from the computer.

Figure 4:
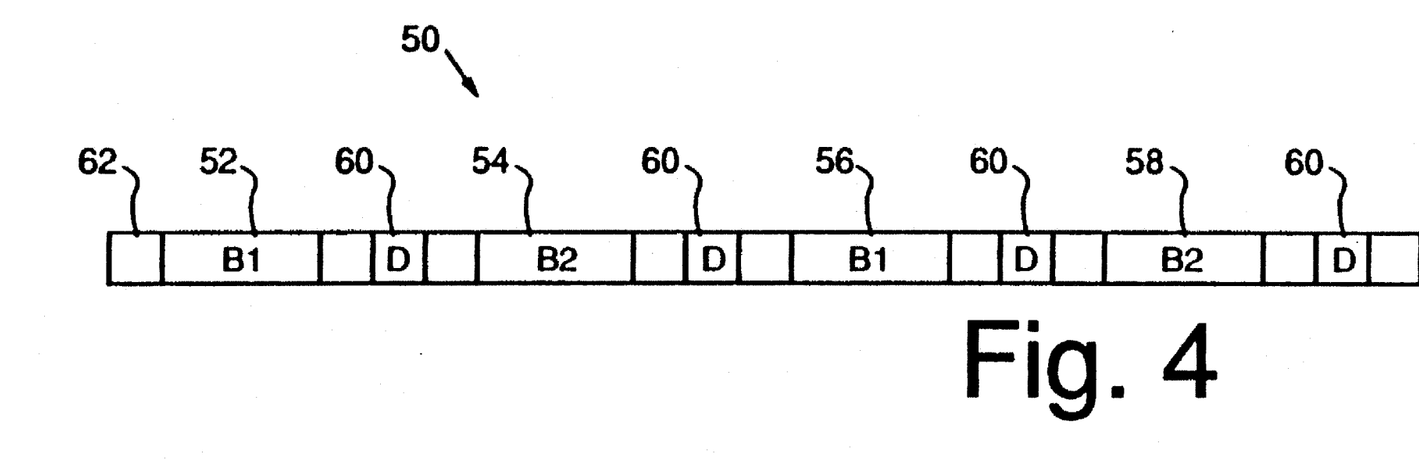
FIG. 4 shows the order of B-channel data bytes and D bits in an ISDN data frame.

FIG. 3 shows a simplified block diagram of a system wherein a source 38 is coupled through an HDLC circuit 40 to an ISDN communications channel 42 through a second HDLC 44 to a destination computer 46. The ISDN network is internally byte aligned, transmitting data in groups of 8 bits. The organization of a byte aligned ISDN frame is shown in FIG. 4. Each frame 50 is comprised of 48 bits including two 8 bit bytes each for two channels B1 and B2, 52–58. Also shown are four D channel bits 60, and blocks 62 containing standard organizational bits. The HDLC circuit as explained above destroys the byte alignment, but if there were a system that could maintain byte alignment throughout, the HDLC circuit as above explained could be eliminated, resulting in a more orderly and less costly system. Clearly, there is a need for a system that could handle the data transmission without the HDLC byte misalignment.

SUMMARY OF THE INVENTION

It is therefore an objective of the present invention to provide a system for communicating from one computer to another while retaining byte alignment throughout the data path.

It is a further object of the present invention to provide a communication transceiver that avoids the need for HDLC hardware.

It is a still further object of the present invention to provide a system for communicating from one computer to another over an Integrated Services Digital Network while retaining byte alignment throughout the data path and thereby eliminating the need for HDLC hardware.

It is another object of the present invention to provide a communications transceiver for communicating from one computer to another retaining byte alignment, such transceiver being particularly suited for use in communication networks that do not require the HDLC frames for router function. The system optionally provides software means for putting data in HDLC frame for use in systems that do require it. The system eliminates the need for expensive HDLC hardware.

Briefly, a preferred embodiment of the present invention includes a system with source and destination telecommunications transceivers for communicating therebetween over an Integrated Services Digital Network, each having a general purpose computer coupled to an interface circuit for conditioning outgoing and incoming data to and from the communications network. The interface circuit is constructed with a dual port RAM, a subscriber access controller and an ISDN controller. A typical data flow proceeds with the source controller CPU sending bytes of data from a sending buffer in its memory to a first transmit buffer in the dual port RAM. This process continues until the last address in the buffer is filled, whereupon the dual port RAM outputs an interrupt signal to the ISDN controller which responds by sending the data bytes in the buffer to the subscriber access controller for transmission to the ISDN, and sends a control signal instructing the computer to load a second transmit buffer. When the first buffer is emptied the ISDN controller instructs the computer to load the second, etc until all the data is transmitted. When data is being received from the ISDN by the subscriber access controller, it sends an interrupt signal to the ISDN controller to hold outgoing data and transfer the incoming data to the computer. The ISDN controller loads the incoming data into one of two receive buffers, and when it is full, sends a signal to the computer to unload the data and proceeds to load the second receive buffer, after which the computer is notified to unload the second buffer. This process is repeated until the incoming data is processed. This process retains byte alignment throughout the interface circuit. In the event that the communications network should require data to be supplied in HDLC frame format, this is provided for by programming in the computer, as is the detection of incoming HDLC framed data and the required extraction of data bytes therefrom.

An advantage of the present invention is that it avoids the need for expensive HDLC frame hardware to interface between a source computer and a communications network.

A further advantage of the present invention is that it can communicate byte aligned data directly to an ISDN system where access is available.

A still further advantage to the present invention is that it provides for communication from one computer to another computer over the ISDN in a way that retains byte alignment throughout the data path resulting in a simplified and less costly system.

These and other objects and advantages of the present invention will no doubt become apparent to those skilled in the art after having read the following detailed description of the preferred embodiment which is illustrated in the several figures of the drawing.

DETAILED DESCRIPTION OF THE PREFERRED EMBODIMENT

Figure 5:
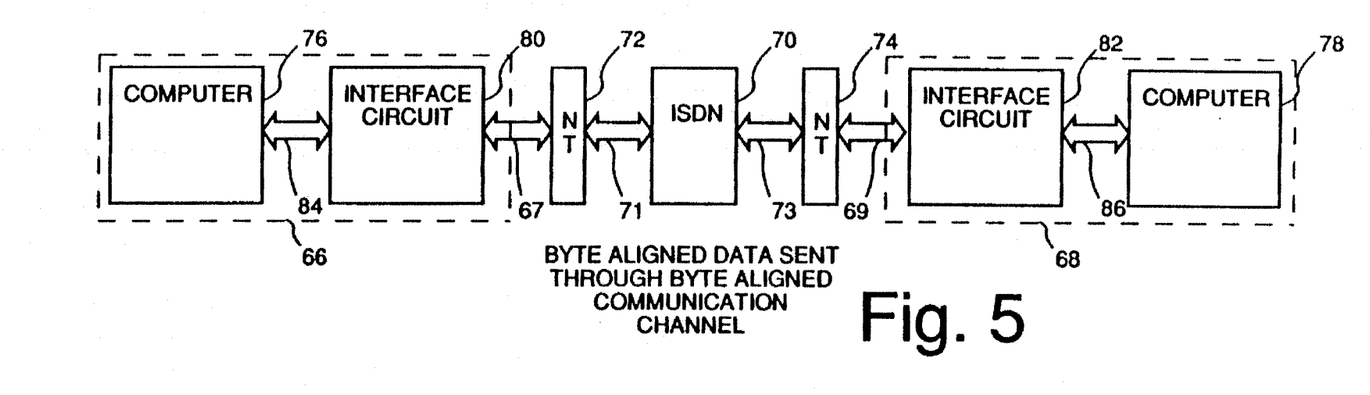
FIG. 5 illustrates the present invention in a pure byte aligned communications system.

Referring now to FIG. 5 of the drawing, there is shown a block diagram of a preferred embodiment of the present invention including a communications system 64 having first and second communications transceivers 66 and 68, for communication over an Integrated Services Digital Network (ISDN) 70. The transceivers 66 and 68 are shown to include general purpose computers 76 and 78 and interface circuits 80 and 82.

Each one of transceivers 66 and 68 is capable of sending and receiving byte aligned data to and from the other. Transceiver 66 is interconnected through bus 67 to a network termination 72 which in turn is shown to connect to an ISDN. An identical arrangement is shown at the other end with the ISDN feeding a network termination 74 through bus 73 and then through bus 69 to the transceiver 68. Although two identical transceivers are shown in the preferred system of FIG. 5, a single transceiver 66 can be used in existing systems to communicate with any ISDN compatible system, as will be more fully explained. Within each transceiver 66, 68 each computer 76, 78 is capable of generating and receives byte aligned data in the normal manner for such apparatus. In the receiving mode, the interface circuits 80, 82 receive 48 bit ISDN frames from the ISDN and extract the data bytes and transfer them to the corresponding computer 76, 78. In transmitting data, each computer 76, 78 sends data bytes to the corresponding interface circuit 80, 82 through bus line 84, 86 which inserts the data bytes into the B-channel 48 bit ISDN frames and sends them to the ISDN.

Figure 6:
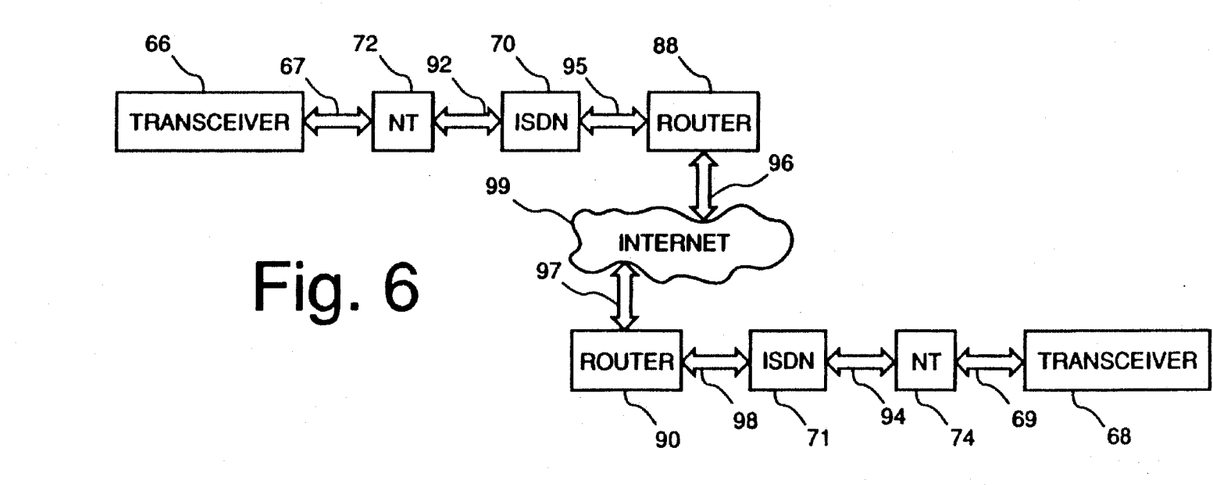
FIG. 6 illustrates the present invention used in a present system having routers requiring HDLC data frame structure.

FIG. 6 illustrates the use of the transceivers 66 and 68 interconnected through an Internet communications network 99 and having intervening ISDN networks 70 and 71 connected to network terminations 72, 74 through buses 92, 94 and to the Internet 99 through routers 88 and 90, and communicating buses 95, 96 and 97, 98. The routers 88, 90 require data received for processing to be packaged in High Level Data Link Control (HDLC) frames as described in the description of the prior art in reference to FIG. 2. The transceivers 66, 68 of the present invention provide for such framing of data through the use of conventional programming within the general purpose computers. The internal interface circuits process the data in the same manner as in the byte aligned case of FIG. 5, not having any need to distinguish between bit streams that do or do not retain the byte alignment as originally generated in the internal computers. When non-byte aligned data in HDLC frames is received by transceiver 68 from transceiver 66, for example, transceiver 66 interprets the data stream, recognizes the HDLC frame bits and extracts the original data bytes. The advantage of the internal interface circuit of the present invention is that it processes data bytes without modification of their bit structure, thereby retaining byte alignment. Since the ISDN B channel also retains byte alignment, the whole system retains such alignment, providing an improved and structurally simplified data flow whenever a byte aligned communications network is available. In the case of systems requiring HDLC framing, the present invention provides the structure through use of internal computer programming, eliminating the more expensive HDLC hardware of the prior art.

The transceiver (66 or 68) of the present invention is compatible with the current preferred Internet access protocol, synchronous Point-to-Point Protocol (PPP), and additionally has the capability of handling octet-based PPP, a proposed Internet standard adapted to ISDN that the present bit-oriented systems are incapable of handling. The transceiver of the present invention additionally has the capacity to handle any new protocol i.e., bit additions and rearrangements, which can be accommodated through conventional computer programming, since the interface circuit of the invention is neutral in that respect. In addition, the transceivers 66, 68 can communicate with any other computer that has access to the ISDN, i.e.; the communications system does not have to be symmetrical with identical transceivers at both ends of the network.

Figure 7:
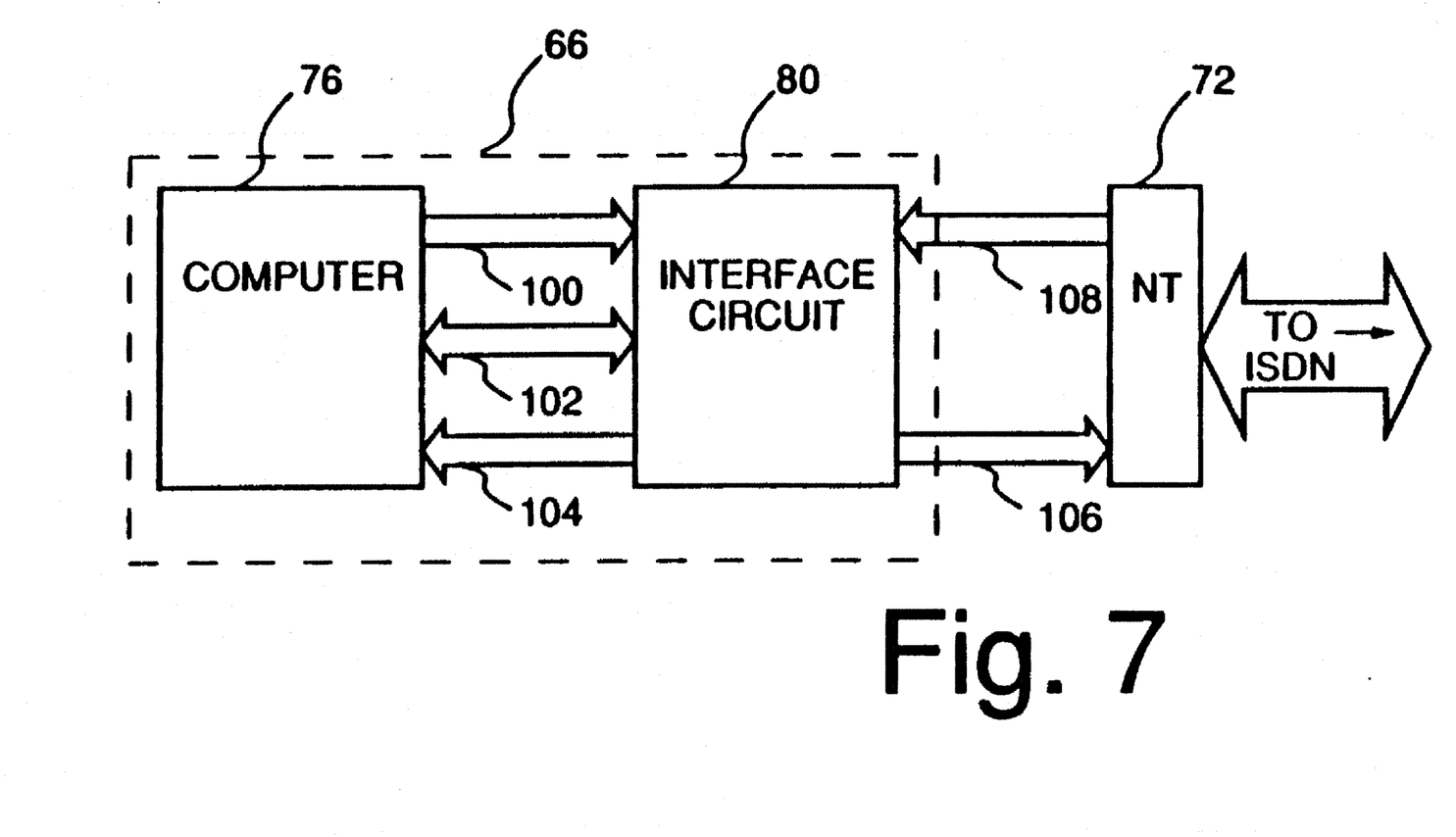
FIG. 7 illustrates the computer-interface circuit interconnections of the telecommunications transceiver of the present invention.

Referring now to FIG. 7, the communications transceiver 66 is shown to contain a computer 76 and an interface circuit 80. Outgoing data sent to the network termination 72 through bus 106 originates in the computer 76, and is transferred to the interface circuit 80 by means of address and control bus 100 and data input/output bus 102, the particular address and control signals on bus 100 selected in response to interrupt signals passed from the interface circuit 80 to the computer 76 via bus 104. The interface circuit 80 processes each data byte received from the computer without altering its alignment, i.e., each eight bit sequence of bits making up each data byte is left unaltered, and places the data bytes in the B-channel of standard ISDN 48 bit data frames for transmission over bus 106 to network termination 72 and thereafter to the ISDN.

Incoming B-channel data bytes from the ISDN through bus 108 are embedded in the 48 bit ISDN data frames. The interface circuit 80 extracts the data bytes from the data frame structure, and by means of an interrupt signal on bus 104, notifies the computer 76 to receive them, whereupon the computer 76 receives the data bytes by way of address and control signals 100 and data bus 102. The above interface circuit description retains byte alignment i.e., does not add or modify any bits within any data bytes. In the event that the communications network requires the data bytes to be embedded in High Level Data Link Control (HDLC) frames, the transceiver 66 provides for this through programming within the computer 76, both in outgoing data by adding the required data bits and flags, and in incoming data bytes by removing the added bits.

Figure 8:
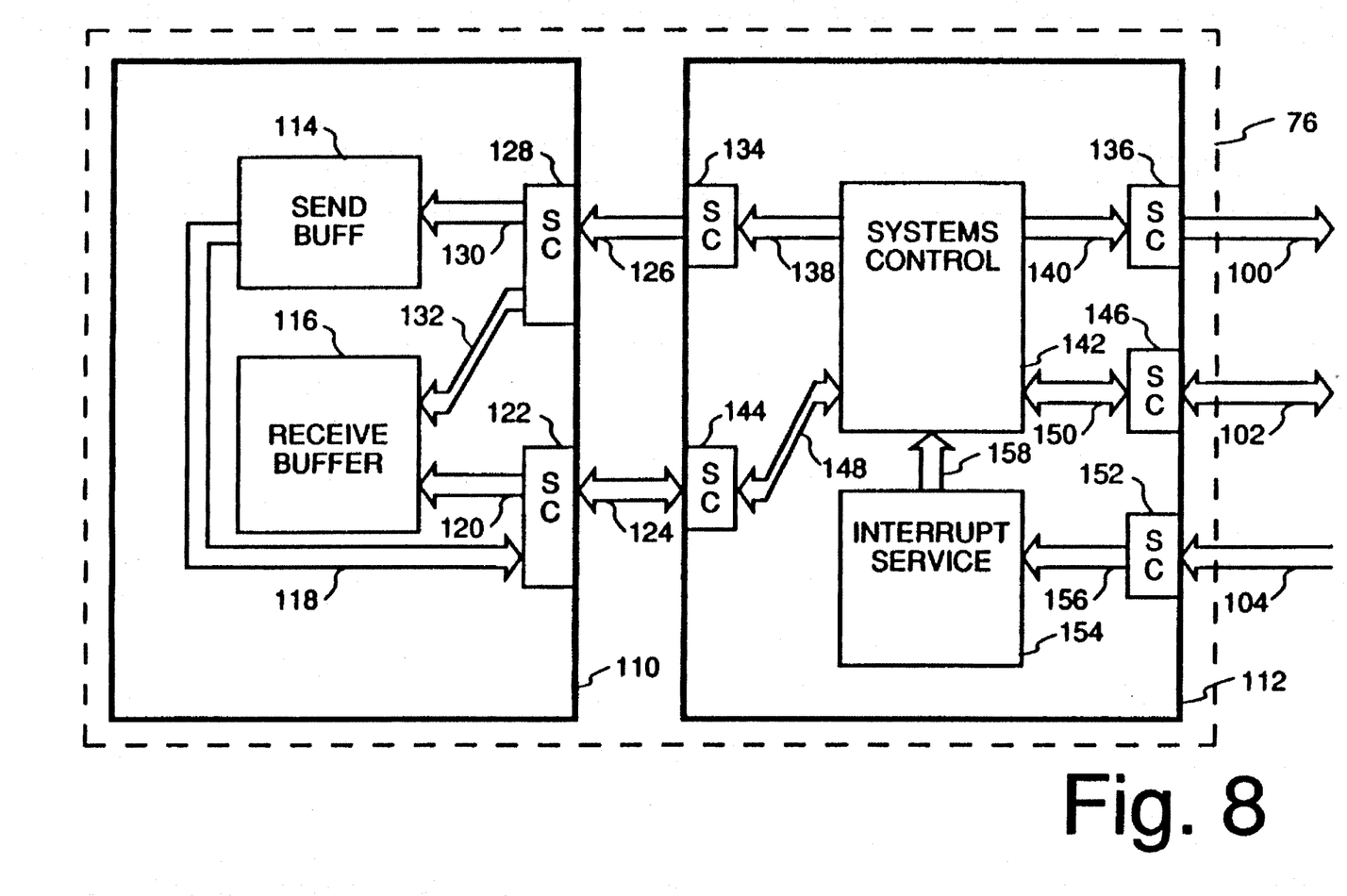
FIG. 8 shows further detail of the organization of the computer in the present invention.

FIG. 8 shows the computer 76 having a memory 110 and a central processing unit (CPU) 112. The memory 110 is further shown to include a computer sending buffer 114 and a computer receiving buffer 116, holding data bytes to be sent via bus line 118 and received via bus 120 through support circuit 122 of bus 124 to CPU 112. The send and receive buffers 114 and 116 are addressed and controlled by the CPU 112 through bus 126, support circuit 128 and bus lines 130 and 132. The connection to address and control bus 100, data bus 102 and interrupt bus 104 are made to the CPU 112 which responds to interrupt signals to send or receive data to and from the interface circuit 80 (FIG. 7).

The CPU 112 responds to first interrupt signals via bus 104 indicating that the circuit 80 is ready to receive data bytes to be transmitted, by addressing data in the send buffer 114 through bus 126, circuit 128 and bus 130 and retrieving it via bus 118, circuit 122 and bus 124. The CPU then addresses the interface circuit 80 according to the particular first interrupt signal by way of bus 100, and sends the data through bus 102.

A second interrupt signal on bus 104 notifies the CPU that data bytes from the ISDN are being held and are ready to be received by the computer 76. In response, the CPU addresses the data bytes through bus 100 and receives them through bus 102. The CPU then addresses the receive buffer 116 through bus 126, circuit 128 and bus 132 and sends the data bytes to the buffer 116 via bus 124, circuit 122 and bus 120.

Further detail of the CPU is also shown in FIG. 8 illustrating support circuits 134 and 136 to buses 126 and 100, and buses 138 and 140 for passing signals from a system control 142. Support circuitry 144 and 146 serve to interface buses 124 with 148, and 102 with 150, completing the bi-directional data path from bus 124 through system control 142 to bus 102. The interrupt function within CPU 112 is shown to include a CPU interrupt interface 152 and an interrupt service 154, with buses 156 and 158 passing signals from interface 152 to service 154 and then to systems control 142.

Figure 9:
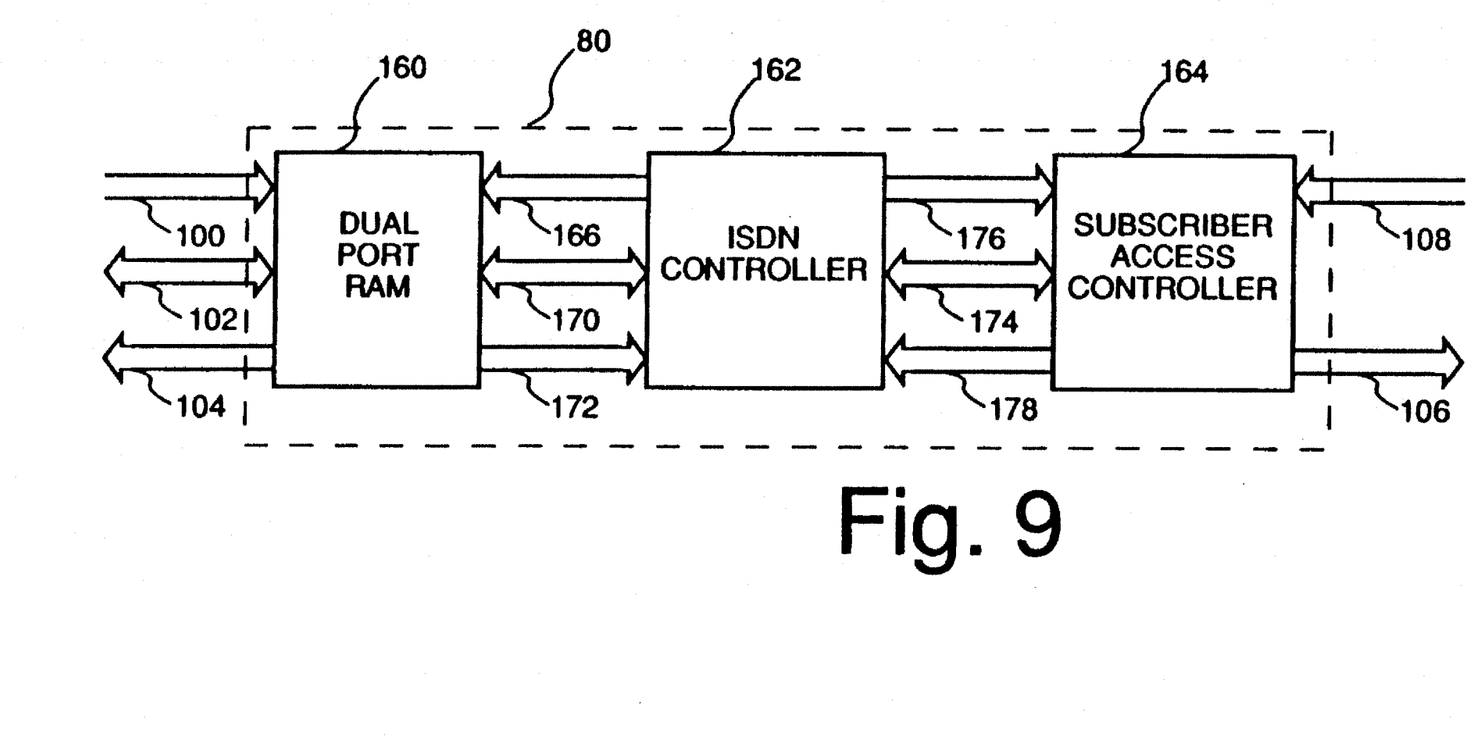
FIG. 9 shows the interconnection of the dual port RAM, ISDN controller and subscriber access controller of the transceiver of the present invention.

Referring now to FIG. 9, the interface circuit 80 is displayed in more detail to show a dual port RAM 160, an ISDN controller 162, and a subscriber access controller 164. The dual port RAM 160 responds to computer address and control signals through bus 100 and first controller address and control signals through bus 166 and generates interrupt signals to buses 104 and 172, all received for the purpose of holding data bytes in double buffered transmit and receive buffers in order to timely pass the data bytes from the computer through bus 102 to the ISDN controller through bus 170 for outgoing data bytes or in the reverse order from the ISDN controller 162 to the computer 76.

For transmitting data bytes, the dual port RAM 160 responds to a first control signal from the ISDN controller through bus 166 indicating that there is transmit buffer space available in the dual port RAM 160 whereupon the dual port RAM sends the first interrupt signal out bus 104 to notify the computer 76 to send the data. The computer 76 in response to the first interrupt signal, as explained in reference to FIG. 8, sends addresses and control signals to bus 100 to the dual port RAM 160 and loads the data to the dual port RAM through bus 102. When the dual port RAM is loaded, the computer sends a second control signal to the dual port RAM on bus 100, the dual port RAM responding by sending a third interrupt signal out on bus 172 to notify the ISDN controller 162 to unload the data via bus 170 from the dual port RAM 160 and send it to the subscriber access controller 164 via bus 174. When the unloading is complete, the ISDN controller sends another first control signal through bus 166 and the loading and unloading process is repeated. This operation will be more fully explained in reference to the following figures.

For receiving data bytes from the ISDN, the dual port RAM receives address and control signals through bus 166 and corresponding data bytes through bus 170 which are loaded into double buffered receive buffers. When one of the buffers is filled, a third control signal so indicating is received through bus 166 and the dual port RAM responds by outputting a second interrupt signal on bus 104 to notify the computer that it should unload data from the dual port RAM. The ISDN controller 162 fills one buffer in the dual port RAM, and then switches to another, and when it is filled, another third control signal is sent etc., until all the data is transferred to the computer. This operation will be more fully explained in relation to the following figures of the drawing.

Leaving further discussion of the ISDN controller for the moment, at the other end of the interface circuit there is the subscriber access controller 164. It is a standard device such as a Siemens 2085 and is used without modification. Its function is to receive data bytes through bus 174 in response to address and control signals received via bus 176. In response to the control signals and data bytes, the subscriber access controller 164 proceeds to place the data bytes in the B-channel of standard ISDN 48 bit frames and sends them out bus 106 to the network termination 72, and from there they are sent through the ISDN. Incoming ISDN frames are received through bus 108, and in response the subscriber access controller 164 extracts the data bytes, stores them in a first-in/first-out buffer and outputs a fourth interrupt signal on bus 178 to the ISDN controller 162. The ISDN controller then responds to the fourth interrupt signal, stops data transmission and sends appropriate address and control signals through bus 176 to unload the data from the subscriber access controller through bus 174.

The ISDN controller, considered now in more concise detail as related to FIG. 9, responds to interrupt signals received through buses 172 and 178 in order to direct data bytes either from bus 174 to bus 170 or 170 to 174. When outgoing data bytes have been loaded to a transmit buffer in dual port RAM 160 by computer 76, the dual port RAM responds by putting the third interrupt signal on bus 172, and the ISDN controller 162, responds by sending a corresponding address and control signal to bus 166 causing the transfer of the data bytes from the dual port RAM 160 to the ISDN controller 162 via bus 170. The ISDN controller then sends address and control signals over bus 176 to the subscriber access controller 164 and transfers the data bytes thereto via bus 174. When the transmit buffer in the dual port RAM is emptied, the ISDN controller 162 sends the first control signal to the dual port RAM via bus 166 and switches to unload the alternate buffer in the dual port RAM. The dual port RAM responds to the first interrupt signal by sending the first interrupt signal to the computer 76 indicating that a transmit buffer is ready to be loaded. This process is continued until the data bytes are all transmitted.

When data bytes arrive from the ISDN, the subscriber access controller applies the fourth interrupt signal to bus 178 and in response the ISDN controller puts any transmission of data bytes on hold, sends an address and control signal via bus 176 to the subscriber access controller and transfers the data byte from the subscriber access controller via bus 174, whereupon an address and control signal is sent via bus 166 to the dual port RAM 160 and the data byte is transferred to the receive buffer in the dual port RAM via bus 170. This process is repeated until the receive buffer is loaded. The ISDN controller then sends the third control signal to the dual port RAM via bus 166, and in response the dual port RAM sends a fourth interrupt signal via bus 104 to the computer to direct it to unload the receive buffer in the dual port RAM. The ISDN controller senses the filling of one receive buffer and switches to load a second receive buffer in the dual port RAM, and when the second one is filled, another fourth interrupt signal is sent to the computer 76 to instruct it to unload the second receive buffer. This process is repeated until all of the incoming data is transferred to the computer.

Figure 10:
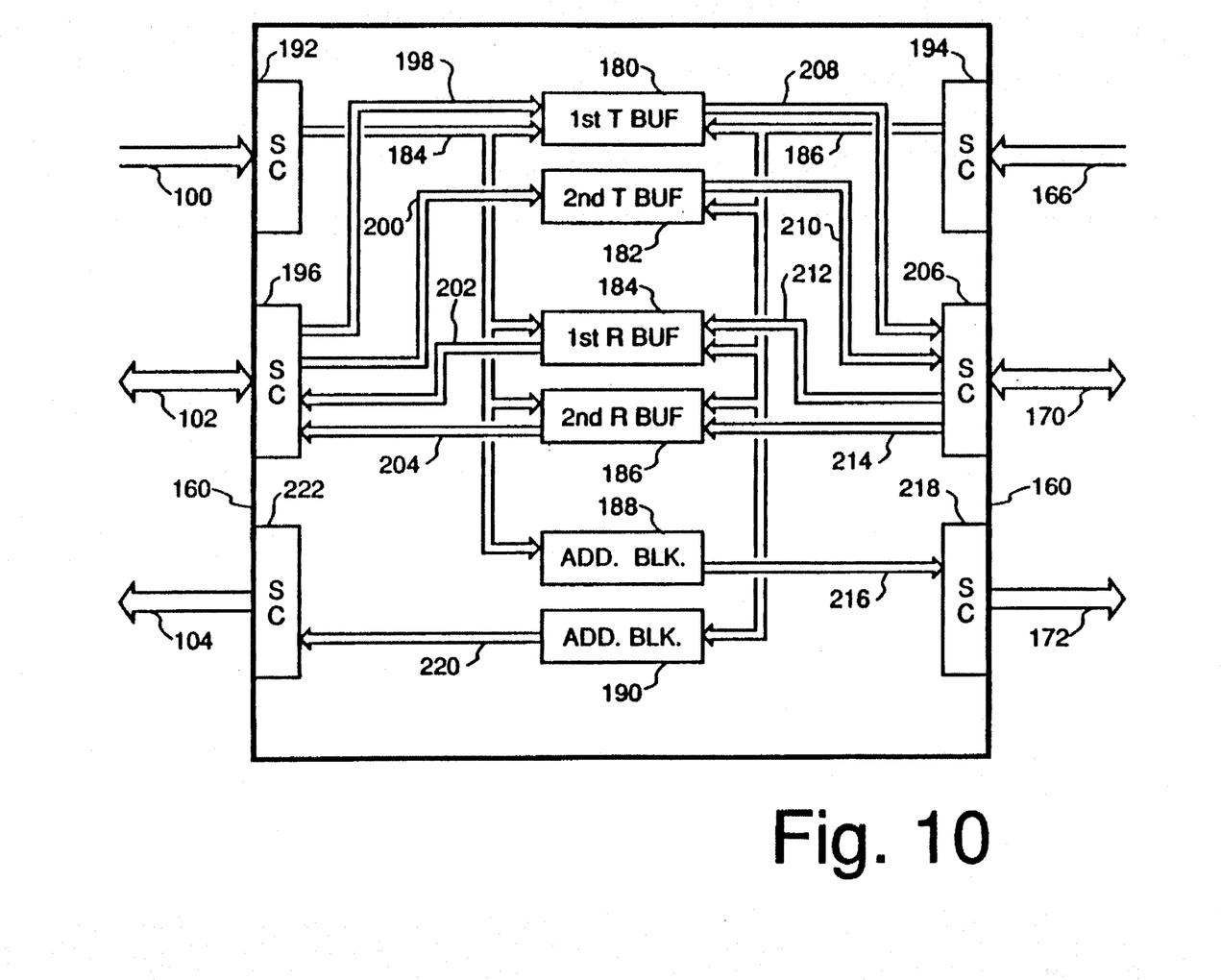
FIG. 10 illustrates the functional operation of the dual port RAM.

The dual port RAM is displayed in further detail in FIG. 10, in which there are shown first and second transmit buffers 180 and 182, first and second receive buffers 184 and 186, and address blocks 188 and 190. Address and control signals from the computer 76 are inputted from bus 100 through an interfacing support circuit 192 and bus 184. Similarly, address and control signals are received from the ISDN controller through bus 166, an interfacing support circuit 194 and bus 186. Data input and output from and to the computer 76 is through bus 102, an interfacing support circuit 196, and bus lines 198, 200, 202 and 204. On the other side, data input and output from and to the ISDN controller is through bus 170, an interfacing support circuit 206 and bus lines 208, 210, 212 and 214. Address block 188 outputs interrupt signals to bus 172 via line 216 and interfacing support circuitry 218, and address block 190 outputs interrupt signals to bus 104 via line 220 and interfacing support circuitry 222.

The second control signal from computer 76 is sent to notify the ISDN controller that one of the first or second transmit buffers is filled and ready for unloading. This signal is sent through bus 100, support circuit 192, and bus 184 to address block 188 which responds by sending the third interrupt signal through bus 216, circuit 218 to bus 172 to the ISDN controller 162 which responds by sending an address and control signal through bus 166 to transfer the data bytes from the full transmit buffer (180 or 182) through bus 208 or 210 depending on which of buffers 180 or 182 is being unloaded, to bus 170. The ISDN controller then sends an address and control signal through bus 176 to the subscriber and access controller 164 and transfers the data bytes thereto through bus 174, whereupon the subscriber access controller inserts them in the B-channel of 48 bit ISDN frames and transmits them through transmit bus 106 to the ISDN via network termination 72. The ISDN controller also sends a first control signal on bus 166 to the dual port RAM to indicate that the computer is to load the alternate buffer. For example, if the ISDN circuit is unloading the first transmit buffer, the first control signal will be to instruct the computer to load the second buffer. The dual port RAM routes the first control signal through bus 186 to address block 190 which responds by outputting the first interrupt signal via bus 220 and circuit 222 to the bus 104 to the computer 76.

When data is being received from the ISDN, the ISDN controller responds to a subscriber access controller fourth interrupt signal, stops transmitting activity and addresses the dual port RAM via bus 166 to load one of the first or second receive buffers. When a receive buffer is filled, a third control signal is sent through the bus 166 through the circuit 194, bus 186 to the address block 190 which responds with a fourth interrupt signal to bus 104 to tell the computer 76 to unload the filled receive buffer. The ISDN controller then switches to load the other receive buffer (first or second). This process is repeated until the data is all received from the ISDN. Address block 188 functions in a similar manner in the transmit mode wherein the computer 76 sends the second control signal through bus 100, circuit 192, bus 184 to the address block 188 which responds by outputting the third interrupt signal via bus 216 and circuit 218 to the bus 172 to inform the ISDN controller that a particular one of the first or second transmit buffers is ready to be unloaded. The ISDN controller responds by addressing the specific transmit buffer through bus 166 and unloading the buffer through bus 170, after which the ISDN controller sends the first control signal through bus 166, circuit 194 and bus 186 to the address block 190 which outputs the appropriate first interrupt signal to the computer via bus 104. This process is continued until all the data is transmitted.

Figure 11:
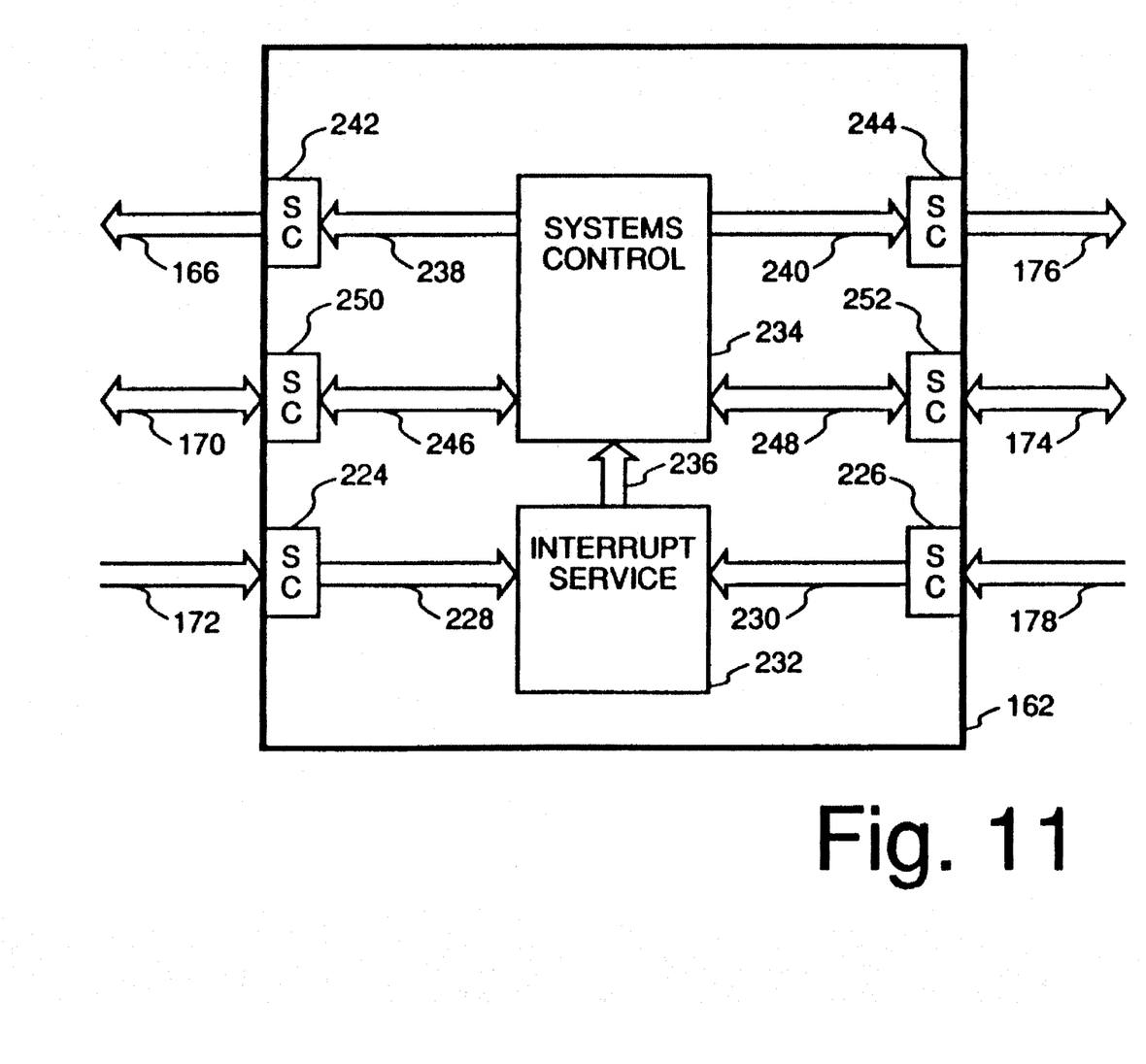
FIG. 11 illustrates further detail of the internal function of the ISDN controller.

The ISDN controller 162 is further detailed in FIG. 11 showing interfacing support circuits 224 and 226 interfacing buses 172 and 178 to buses 228 and 230 leading to interrupt service 232 which interconnects to a systems control 234 through bus 236. The systems control 234 supplies the address and control signals to buses 166 and 176 through bus lines 238 and 240 and interfacing support circuits 242 and 244, and inputs and outputs data from and to buses 170 and 174 through bus lines 246 and 248 and interfacing support circuits 250 and 252.

Figure 12:
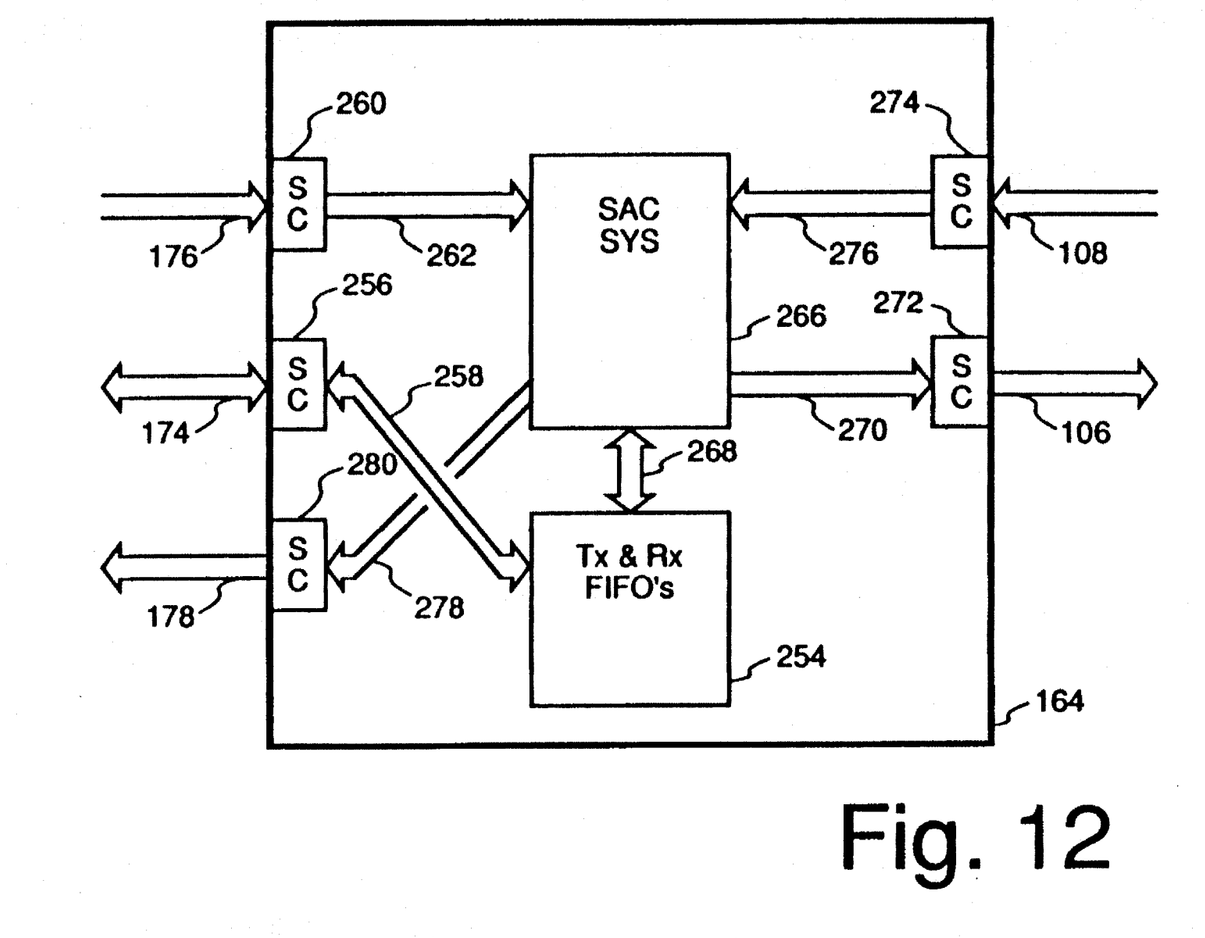
FIG. 12 illustrates functional components of the subscriber access controller.

As mentioned above, the subscriber access controller is a standard part that is used without modification. Further detail is shown in FIG. 12 illustrating a dual first-in/first-out (FIFO) buffer 254 for holding incoming data bytes from the ISDN and outgoing data bytes from the computer 76. The outgoing data is received from bus 174 via interfacing support circuit 256 and bus 258, the Transmit FIFO 254 being addressed by the dual port RAM through bus 176, interfacing support circuit 260 and bus 262 to the subscriber access controller system 266 which directs the FIFO through bus 268. The data is then passed to the subscriber access controller system 266 via bus 268, placed in the B-channel of 48 bit ISDN data frames by the subscriber access controller system 266 which are then outputted to the transmit port 106 via bus 270 and interfacing support circuit 272.

Incoming data in the 48 bit ISDN frames is received from the ISDN through port 108 via interfacing support circuitry 274 and bus 276 to the subscriber access controller system 266 which extracts the data bytes and places them in the Receive FIFO 254 via bus 268. The subscriber access controller then sends the fourth interrupt signal via bus 278 and interfacing support circuit 280 to bus 178 to alert the ISDN controller that it should stop transmitting and unload the incoming data bytes from the Receive FIFO 254. The ISDN controller then addresses the FIFO through bus 176, support circuit 260 and bus 262 to subscriber access controller system 266 which directs the appropriate data in the FIFO through bus 268 to be outputted to bus 174 via bus 258 and support circuitry 256.

Although a preferred embodiment of the present invention has been described above, it will be appreciated that certain alterations and modifications thereof will become apparent to those skilled in the art. It is therefore intended that the appended claims be interpreted as covering all such alterations and modifications as fall within the true spirit and scope of the invention.

What is claimed is:

1. A communications transceiver for transmitting and receiving data to and from an ISDN comprising:

computer means responsive to a computer interrupt signal for generating a computer address and control signal, and for outputting and receiving data signals in data byte format;

interface circuit means having a receive port and a transmit port for connection to a network termination device to receive and transmit ISDN B-Channel information, said interface circuit means being responsive to said computer address and control signal and operative to receive said data signals in data byte format from said computer means, and to process said data signals without changing their bit organization, and to insert the data signals into the B-Channel of ISDN frames of an ISDN signal format for output via said transmit port to said network termination device, said Interface circuit means being further operative to receive ISDN frames from said network termination device via said receive port and operative to generate said computer interrupt signal and to extract data bytes from the incoming ISDN frames and output said data bytes to said computer means.

2. A communications transceiver system as recited in claim 1 wherein said interface circuit means includes dual port RAM means responsive to said computer address and control signal and to a first ISDN controller address and control signal and operative in a transmit mode to alternate between loading and storing transmit data bytes from said computer, and unloading the stored transmit data bytes, and further operative in a receive mode to alternate between loading and storing receive data bytes received via said receive port and unload the stored receive data bytes for input to said computer means, and said dual port RAM means being further operative to generate said computer interrupt signal and to generate first ISDN controller interrupt signal.

3. A communications transceiver system as recited in claim 2 wherein said interface circuit means further includes subscriber access controller means responsive in a receive mode to second ISDN address and control signals and to said ISDN frames received via said receive port and operative to extract B channel receive data bytes from said ISDN frames and to generate a second ISDN controller interrupt signal and output said receive data bytes.

4. A communications transceiver system as recited in claim 3 wherein said subscriber access controller means is responsive in a transmit mode to said second ISDN address and control signal, and is operative to receive and inject transmit data bytes into the B-channel of ISDN frames for transmission to an Integrated Services Digital Network via said transmit port.

5. A communications transceiver system as recited in claim 4 wherein said interface circuit means further includes ISDN controller means responsive in a transmit mode to said first ISDN controller interrupt signal and operative to generate said first ISDN address and control signal and said second ISDN address and control signal, said first ISDN address and control signal being operative to cause said dual port RAM means to output said stored transmit data bytes and said computer interrupt signal, said second ISDN address and control signal being operative to cause said subscriber access control means to receive said transmit data bytes.

6. A communications transceiver system as recited in claim 5 wherein said ISDN controller means further includes means responsive in a receive mode to said second ISDN controller interrupt signal and operative to generate said second ISDN address and control signal to cause said subscriber access controller to output said receive data bytes and to generate said first ISDN address and control signal to cause said dual port RAM means to receive said receive data bytes, and to cause said dual port RAM means to generate said computer interrupt signal.

7. A communications transceiver as recited in claim 6 wherein said dual port RAM means includes transmit buffer means;

first interfacing support circuit means;

second interfacing support circuit means;

third interfacing support circuit means;

fourth interfacing support circuit means;

fifth interfacing support circuit means;

sixth interfacing support circuit means; and interrupt means;

said transmit buffer means being responsive to said computer address and control signal received via said first interfacing support circuit means and operative to store data bytes received via said second interfacing support circuit means, said interrupt means being responsive to said computer address and control signal and operative to generate an interrupt signal for communication to said ISDN controller via said sixth interfacing support circuit means causing said ISDN controller to generate said first ISDN address and control signal for input to said dual port RAM means via said fourth interfacing support circuit means to cause said transmit buffer means to output stored transmit data bytes to said ISDN controller means via said fifth interfacing support circuit means, and to cause said interrupt means to generate and output said computer interrupt signal via said third interfacing support circuit means to cause said computer means to generate said computer address and control signal and to output said transmit data bytes.

8. A communications transceiver as recited in claim 7 wherein said dual port RAM means further includes receive buffer means responsive to said first ISDN address and control signal received via said fourth interfacing support circuit means and operative to store receive data bytes received via said fifth interfacing support circuit means, and said interrupt means being responsive to said first ISDN address and control signal received via said fourth interfacing support circuit means and operative to generate and output said computer interrupt signal to said computer means via said third interfacing support circuit means to cause said computer means to generate and output said computer address and control signal to said receive buffer means via said first interfacing support circuit means to cause said dual port RAM means to unload and output said received data bytes from said receive buffer means to said computer means via said second interfacing support circuit means.

9. A communications transceiver as recited in claim 6 wherein said ISDN controller means includes systems control means;

interrupt service means;

first interfacing support circuit means;

second interfacing support circuit means;

third interfacing support circuit means;

fourth interfacing support circuit means;

fifth interfacing support circuit means;

sixth interfacing support circuit means;

wherein, when operating in a transmit mode, said interrupt service means is responsive to said first ISDN controller interrupt signal received via said third interfacing support circuit means and operative to send a first interrupt service control signal to said systems control means to cause said systems control means to output said first ISDN address and control signal via said first interfacing support circuit means to cause said dual port RAM means to output said transmit data bytes and to output said computer interrupt signal, and to cause said system control means to receive said transmit data bytes via said second interfacing support circuit means, and said systems control means to output said second ISDN address and control signal via said fourth interfacing support circuit means to cause said subscriber access controller means to receive said transmit data bytes from said systems control means via said fifth interfacing support circuit means.

10. A communications transceiver as recited in claim 9 wherein, when operating in a receiving mode, said interrupt service means is responsive to said second ISDN controller interrupt signal received via said sixth interfacing support circuit means and operative to output a second interrupt service control signal to said systems control means to cause said systems control means to output said second ISDN address and control signal via said fourth interfacing support circuit means to cause said subscriber access controller means to output said receive data bytes, and to cause said systems control means to receive said receive data bytes via said fifth interfacing support circuit means, and to output said first ISDN address and control signal via said first interfacing support circuit means to cause said dual port RAM means to receive said receive data bytes from said systems control means via said second interfacing support circuit means, and to cause said dual port RAM means to output said computer interrupt signal.

11. A communications transceiver system as recited in claim 1 wherein each said data byte is made up of eight data bits and wherein said computer means further includes first programming means for inserting the data bits forming the structure of each original data byte into a predetermined format of data bits for making up a data frame of data bytes for outputting to said interface circuit; and second programming means for removing said original data bytes from data frames received by said computer means from said interface circuit means.

12. A transceiver system as recited in claim 11 wherein said data frames are High Level Data Link Control frames.

13. A transceiver system as recited in claim 8 wherein said transmit buffer means includes a first transmit buffer means and a second transmit buffer means, wherein when said ISDN controller is receiving transmit data bytes from one of said first and second transmit buffer means, data bytes from said computer means can be loaded into the other one of said first and second transmit buffer means; and said receive buffer means includes a first receive buffer means and a second receive buffer means, wherein when said computer means is receiving receive data bytes from one of said first and second receive buffer means, receive data bytes from said ISDN controller are being loaded into the other one of said first and second receive buffer means.

* * * * *